United States Patent [19]

Gosch et al.

[11] Patent Number: 4,612,173

[45] Date of Patent: Sep. 16, 1986

[54] METHOD OF PURIFYING BY-PRODUCT GYPSUM

[75] Inventors: Hans-Werner Gosch; Karl Franke, both of Essen; Jörg Kohlbecker, Rheinberg; Bahram Dormichian, Essen, all of Fed. Rep. of Germany

[73] Assignee: Krupp Koppers GmbH, Essen, Fed. Rep. of Germany

[21] Appl. No.: 585,990

[22] Filed: Mar. 2, 1984

[30] Foreign Application Priority Data

Mar. 2, 1983 [DE] Fed. Rep. of Germany ....... 3307315

[51] Int. Cl.⁴ .................. C01F 11/46; C01F 11/08; C04B 11/00; B01D 21/01
[52] U.S. Cl. .................. 423/170; 423/555; 423/490; 106/109; 210/724
[58] Field of Search ......... 423/170, 178, 555, DIG. 6, 423/158, 163, 490, 555; 106/109, 110; 210/724

[56] References Cited

U.S. PATENT DOCUMENTS

| | | | |
|---|---|---|---|
| 1,756,637 | 4/1930 | Edwards | 423/170 |
| 2,914,474 | 11/1959 | Hillyer et al. | 423/490 |
| 3,551,332 | 12/1970 | Baumann et al. | 423/490 |
| 3,625,648 | 12/1971 | Randolph | 423/178 |
| 4,145,282 | 3/1979 | Bruckenstein | 423/163 |
| 4,171,342 | 10/1979 | Hirk et al. | 423/178 |
| 4,415,543 | 11/1983 | Wilson et al. | 423/178 |
| 4,472,368 | 9/1984 | O'Neill et al. | 423/167 |

FOREIGN PATENT DOCUMENTS 3110829 9/1982 Fed. Rep. of Germany.

OTHER PUBLICATIONS

Olsen, *Unit Processes and Principles of Chemical Engineering*, 1932, pp. 1-3, D. Van Nostrand Co. Inc..

Primary Examiner—Gary P. Straub
Attorney, Agent, or Firm—Michael J. Striker

[57] ABSTRACT

Disclosed is a method of purifying by-product gypsum by making it into a sludge and washing the sludge in a single, multi-stage filtering washer. The washing liquid is recovered from the filtrate from the first stage of the washer and subject to neutralization in a two-stage neutralizing unit. The sludges separated in the neutralizing unit are dried and the excessive washing liquid from the second stage of the neutralizing unit is further processed in an evaporation stage.

6 Claims, 1 Drawing Figure

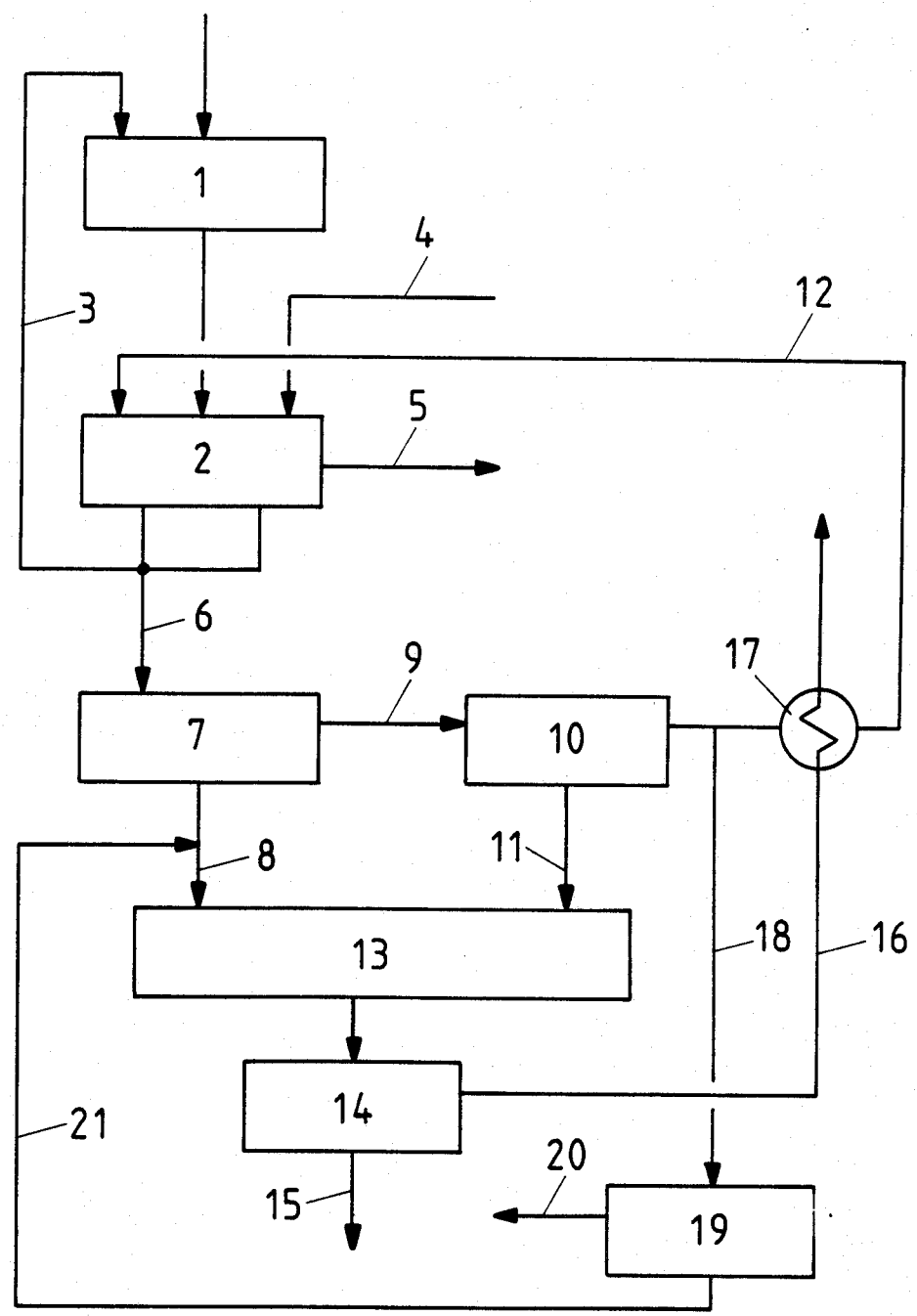

METHOD OF PURIFYING BY-PRODUCT GYPSUM

BACKGROUND OF THE INVENTION

The present invention relates to a method of purifying by-product gypsum by making it into a paste or sludge by means of an aqueous liquid and washing the sludge in a multi-stage washer by the aqueous liquid, whereby a partial stream of waste liquid obtained in the washer is recirculated into the sludge forming stage.

Under the term "by-product gypsum" is to be understood calcium sulfate obtained as by-product in large-scale chemical processing. Such calcium sulfate results from the reaction of calcium compounds with sulfuric acid, whereby the largest amount of the by-product gypsum is yielded in the wet production of phosphoric acid during the decomposition of phosphate ores by sulfuric acid as well as in the production of hydrofluoric acid by chemically attacking calcium fluoride with sulfuric acid. Depending on its origin, the by-product gypsum includes water-soluble impurities such as phosphoric and fluoric compounds which have a detrixental effect for further processing of the gypsum and therefore must be removed.

It is already known how to remove such impurities, by mixing the by-product gypsum with water to make it into a paste, and subsequently by filtering and simultaneously washing the paste with fresh water. An essential disadvantage of this prior-art method is the fact that a relatively large quantity of fresh water is consumed during the treatment, whereby correspondingly large amounts of waste water are accumulated. Waste water obtained in this process contains the impurities dissolved from the raw by-product gypsum. For example, in washing the so-called phosphoric acid gypsum about 0.9 g/l $P_2O_5$ and about 0.4 g/l F is contained in the accumulated waste water. Such contaminated water, however, cannot be discharged into channels without corresponding purification. As a consequence, the cost for treating waste water represents a considerable burden in the purifying process of the by-product gypsum and impairs the economy of its production.

Numerous attempts have already been made during the purifying process of the by-product gypsum either to eliminate or to substantially reduce the waste water. For instance, it is known to clean by-product gypsum by its conversion from one hydration stage into another one. It is true that this known method produces no waste water, but it is so expensive that in comparison with the aforedescribed contaminating process of the waste water no effective economic advantage is achieved.

From the German publication DE-OS No. 3,110,829 a method of purifying the so-called phosphoric acid gypsum is known in which for avoiding the accumulation of waste water a part of the waste water is returned into the sludge forming stage and the remainder of the waste water is employed as washing water in the filtering stage for the phosphoric acid. Such a combination of a purifying process with the preceding production process with which the by-product gypsum is obtained, is in many cases undesirable either on the grounds of operational economy or due to spatial limitations, inasmuch as the feasibility of the purifying process depends on the absorption capacity of the preceding production process and in addition, due to this close coupling, the operational equipment for the two processes must be arranged in close proximity to each other.

SUMMARY OF THE INVENTION

It is therefore a general object of the present invention to overcome the aforementioned disadvantages.

More particularly, it is an object of the invention to provide an improved method of purifying by-product gypsum, in which the accumulation of waste water is avoided.

An additional object of this invention to provide such an improved cleaning method which is independent from the preceding production process.

A further object of this invention is to provide a purifying method for a by-product gypsum in which the consumption of fresh water which represents a cost-increasing factor, is substantially reduced.

In keeping with these objects and others which will become apparent hereafter, one feature of the invention resides, in a purifying method of the aforedescribed kind, in washing the gypsum sludge in a single filtering station, whereby filtrate from the first washing stage in the station is prepared for use as a washing medium; a part of the filtrate received from the first washing stage is fed into a subsequent filtrate processing stage whereas the remaining part of the filtrate from the first stage, together with the filtrate from the remaining washing stages is returned in the sludge forming stage; the part of the filtrate from the washing stage which is supplied in the preparation stage is processed in two separate neutralizing stages, whereby in the first neutralizing stage the pH-value of the filtrate is adjusted to 2.5 to 4.5 by the addition of calcium ions, and the obtained sludge is separated from the filtrate, whereupon the latter filtrate is fed to the second neutralization stage where by repeated addition of calcium ions its pH-value is adjusted from 9 to 13 and the obtained sludge is separated from the filtrate, whereby the latter filtrate is returned as washing medium into the washing stage; the sludges separated in the filtrate preparation stage are fed either individually or together to a mechanical draining stage, and therefrom to a drying stage; and excessive filtrate from the second neutralizing stage which is not used for the washing of the gypsum in the washing stage is concentrated in an evaporation stage, whereby the resulting distillate is used as a fresh water or cooling water or boiler water, and the separated brine together with the sludges from the filtrate preparation stage is dried.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a block circuit diagram of equipment for carrying out the method of this invention. It will be noted that the block diagram represents conventional devices well known in the art which need not be described in detail for making and using this invention.

DESCRIPTION OF THE PREFERRED EMBODIMENT

The processing arrangement shown in the FIGURE relates to the cleaning of the so-called phosphoric acid gypsum, which includes water-soluble 1.25% by weight $P_2O_5$ and 0.32% by weight F as water-soluble impurities, referred to as the dihydrate ($CaSO_4 \cdot 2H_2O$).

For the intended further processing of this material in a phosphoric acid gypsum plant, this gypsum however is permitted to include only 0.5% by weight $P_2O_5$ and 0.15% by weight F impurities, relative to the dihydrate. Unwashed by-product gypsum arriving from a non-illustrated phosphoric acid plant is introduced first into a sludge forming stage 1. In the stage 1 the gypsum is made into a pasty substance by the addition of filtrate from the subsequent washing stage 2. The sludge forming stage 1 may consist for example of several consecutively arranged agitating containers in which the gypsum is subject to strong mixing until the pasty condition or sludge is achieved. A partial stream of the aqueous filtrate from the first stage of the filtering washing is supplied via return conduit 3 into the sludge forming stage 1. The resulting sludge from the stage 1 is fed through consecutive stages of washer 2 in which the gypsum is filtered in a single filtering unit which can be in the form of a band filter, drum filter or a centrifugal filter, in which the gypsum is washed with a prepared filtrate, as will be explained below, and if desired with a counterstream of fresh water. The resulting purified gypsum is discharged through discharge conduit 5. The purified gypsum contains, relative to the dihydrate, only about 0.5% by weight $P_2O_5$ and 0.15% by weight F of impurities, and meets therefore the requirements for further processing in a gypsum processing plant, for example.

Filtrate obtained in the first washing stage of the washer 2 is discharged through conduit 6, from which another partial stream corresponding at least to the amount required for the washing operation in washer 2 is supplied into a first neutralizing stage 7 of a filtrate preparation unit. As mentioned before, another partial stream of the filtrate from the washer 2, which is not supplied to the preparation unit, is united with the filtrate from the remaining washing stages of the washer 2 and recirculated through the return conduit 3 into the sludge forming stage 1. In the first neutralizing stage 7 the filtrate is admixed with calcium ions so as to obtain a pH-value of 2.5 to 4.5. In the first neutralization stage, about 99% of fluorine-containing components (fluorine compounds and elementary fluorine) contained in the filtrate are precipitated. The resulting sludge, rich in calcium fluoride, is discharged from the first neutralizing stage 7 through conduit 8, whereas filtrate free of this sludge is supplied via conduit 9 into a second neutralizing stage 10 where, by addition of calcium ions, the pH-value of the free filtrate is adjusted to 9 to 13. In doing so, about 95% of $P_2O_5$ still contained in the free filtrate, as well as about 90% of $SiO_2$, are precipitated. As in the preceding stage, the resulting sludge is again separated from the filtrate and discharged through conduit 11 from the second neutralizing stage 10. The first and second neutralizing stages, together with corresponding devices for separating the enriched sludges, form together the beforementioned filtrate preparation unit, participating in the method of this invention.

It has been proved that, due to the inventive neutralization in two mutually separated stages, a substantial improvement in the purification of the filtrate is achieved in comparison with neutralization made in a single stage. The filtrate of the second stage 10, which contains only less than 30 ppm $P_2O_5$ and less than 10 ppm F of impurities, is discharged through return conduit 12 and recirculated as washing liquid in individual washing stages of washer 2. In addition, fresh water is supplied to washer 2 via conduit 4 to cover water leakages and losses which may occur in the processing circuit of this invention. The amount of fresh water supplied through conduit 4 is maximum 0.05 cubic meters per ton of gypsum, relative to the dihydrate ($Ca_2SO_4 \cdot 2H_2O$).

Sludges discharged via conduits 8 and 11 from the two neutralizing stages can be united in a common mechanical draining stage 13, in which they are drained up to a residual water content of less than 70% by weight. From the draining stage 13, the sludges are fed into a drying stage 14 which can be constructed for example as a spraying dryer or a drum dryer, and where a complete drying of the sludges is performed. The resulting dry product is discharged through discharge conduit 15 and can be employed for example as a starting material for the production of hydrofluoric acid. Hot exhaust gases from the dryer 14 are withdrawn from conduit 16 and used in a heat exchanger 17 for heating up free filtrate in conduit 12 used as the washing medium. It has been found that washing effects in washer 2 can be substantially improved when the relieved filtrate which is used as a washing medium has a temperature above 30° C.

In this example, the sludges discharged from the first and second neutralization stages are processed together. Of course, a modification is also possible to process these sludges independently, particularly in the case when different application is intended for the calcium fluoride-rich sludge from the first neutralization stage 7.

In a normal case it is assumed that the prepared filtrate, discharged from the second neutralization stage 10, is completely recirculated through conduit 12 into the washer 2, inasmuch as the consumption of the washing medium in washer 2 amounts to between 0.3 and 0.8 cubic meters per ton of gypsum, relative to the dihydrate. It cannot be excluded, however, that when additional streams of water are introduced into the cleaning process, that a larger quantity of filtrate is available at the outlet from the second neutralization stage 10 than the conduit 12 can accept. In this case, it is necessary that the excessive filtrate is branched off through conduit 18 and processed in an evaporator stage 19. In the stage 19 the filtrate is decomposed in a distillate and a brine. The distillate, which in practice is distilled water, is withdrawn through conduit 20 and can be used as fresh water, cooling water, or boiler water in another station of the processing plant. Accordingly, it is also possible to use a portion of the filtrate which is treated in the evaporation stage 19 for recovering fresh water which is supplied via conduit 4 into the washer 2, thus achieving an improved washing effect. The separated brine in the evaporation stage 19, which contains impurities in concentrated form, is discharged through conduit 21 and added to the sludges discharged from the neutralization stage for treatment in the mechanical draining device 13. In this manner it is ensured that, in the method of this invention, any accumulation of waste water is effectively prevented. Due to the inventive recirculation of the filtrate from the washer 2, the consumption of replenishing fresh water is minimized, so that only minute amounts of fresh water, such as 0.05 cubic meters per ton of gypsum, relative to the dihydrate, or less, need be supplied through the conduit 4.

Inasmuch as, in the method of this invention, there is no combination or coupling between the purification stages and the preceding processing stages at which the by-product gypsum is obtained, the method of this invention is applicable for all kinds of by-product gypsum and is not limited to a specific variety, such as for example a phosphoric acid gypsum.

It will be understood that each of the elements described above, or two or more together, may also find a useful application in other types of constructions differing from the types described above.

While the invention has been illustrated and described as embodied in a method for purifying a specific kind of by-product gypsum, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims; We claim:

1. A method of purifying by-product gypsum obtained in the production of phosphoric or hydrofluoric acids and including water-soluble impurities, comprising the steps of mixing in a sludge forming stage the by-product gypsum with water to form a paste-like sludge; feeding the sludge into a multi-stage filtering washer having an inlet for washing, an outlet for discharging purified gypsum, and outlets for discharging filtrate portions from respective filtering and washing stages; feeding a first filtrate portion from the first filtering and washing stage into a filtrate preparing unit where a major part of the impurites is precipitated and simultaneously returning a second filtrate portion from another filtering and washing stage into said sludge-forming stage; said filtrate preparation unit having two consecutive neutralization stages where said first filtrate portions is neutralized to pH 2.5-4.5 separated from precipitates, then neutralized to pH 9-13, again separated from precipitatates and then split into two partial streams; recycling one of said partial streams into said washing water inlet of the washer and feeding the other partial stream into an evaporation stage where it is decomposed into a distillate and a brine; discharging the precipitates separated in said first and second neutralization stage to a mechanical draining stage and to a subsequent drying stage; admixing said brine from the evaporation stage to said separated sludges during their discharge from said neutralization stages and prior to the draining and drying stages; and utilizing said distillate as fresh water or a cooling water or as a boiler water.

2. A method as defined in claim 1, wherein the precipitates from said filtrate preparing unit are drained in said mechanical draining stage to a residual water content of less than 70% by weight.

3. A method as defined in claim 1, wherein hot exhaust gases from the drying stage are used for a direct or indirect heating of the washing liquid recirculated from the second neutralizing stage to the filtering washer.

4. A method as defined in claim 1, wherein the washing liquid recirculated from the outlet of the second neutralizing stage is supplied to said filtering washer at a temperature above 30° C.

5. A method as defined in claim 1, wherein said by-product gypsum is obtained in decomposing phosphate ores or calcium fluoride by sulfuric acid during the production of phosporic or hydrofluoric acids and the amount of recirculated washing liquid from the outlet of the second neutralizing stage is between 0.3 and 0.8 cubic meters per ton of gypsum, relative to the dihydrate ($CaSO_4 \cdot 2H_2O$).

6. A method as defined in claim 1, wherein the amount of fresh water supplied into said multi-stage filtering washer is at most 0.5 cubic meters per ton of gypsum, relative to the dihydrate ($CaSO_4 \cdot 2H_2O$).

* * * * *